United States Patent
Kim et al.

(10) Patent No.: US 10,323,617 B2
(45) Date of Patent: Jun. 18, 2019

(54) APPARATUS AND METHOD FOR STARTING ENGINE OF MILD HYBRID ELECTRIC VEHICLE

(71) Applicants: Hyundai Motor Company, Seoul (KR); Kia Motors Corporation, Seoul (KR)

(72) Inventors: YoungMin Kim, Yongin-si (KR); Yong Ug Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/828,669

(22) Filed: Dec. 1, 2017

(65) Prior Publication Data
US 2018/0163686 A1 Jun. 14, 2018

(30) Foreign Application Priority Data
Dec. 13, 2016 (KR) .................. 10-2016-0169481

(51) Int. Cl.
| | |
|---|---|
| *F02N 11/08* | (2006.01) |
| *B60K 6/22* | (2007.10) |
| *B60W 10/04* | (2006.01) |
| *B60W 20/00* | (2016.01) |
| *B60W 30/192* | (2012.01) |
| *B60K 6/485* | (2007.10) |
| *F02N 19/00* | (2010.01) |
| *F02N 11/00* | (2006.01) |
| *F02N 11/04* | (2006.01) |

(52) U.S. Cl.
CPC .............. *F02N 11/08* (2013.01); *B60K 6/22* (2013.01); *B60K 6/485* (2013.01); *B60W 10/04* (2013.01); *B60W 20/00* (2013.01); *B60W 30/192* (2013.01); *F02N 19/005* (2013.01); *B60W 2510/244* (2013.01); *B60W 2550/12* (2013.01); *B60Y 2200/92* (2013.01); *F02N 11/006* (2013.01); *F02N 11/04* (2013.01); *F02N 2200/061* (2013.01); *F02N 2200/122* (2013.01); *F02N 2300/2002* (2013.01); *Y02T 10/6226* (2013.01)

(58) Field of Classification Search
CPC ..... F02N 11/08; F02N 2220/122; B60K 6/22; B60W 10/00–10/04; B60W 20/00; B60W 30/192; B60W 2510/244; B60Y 2200/92
USPC ..... 701/22, 113; 903/903; 180/65.21, 65.28, 180/65.29; 477/167; 307/10.6
See application file for complete search history.

(56) References Cited

U.S. PATENT DOCUMENTS

| | | | | |
|---|---|---|---|---|
| 4,762,106 | A * | 8/1988 | Blauhut | F02P 5/1455 123/406.42 |
| 2013/0046435 | A1* | 2/2013 | Shin | F02N 11/08 701/32.8 |
| 2013/0268182 | A1* | 10/2013 | Treharne | F02N 11/0829 701/113 |

* cited by examiner

Primary Examiner — Marthe Y Marc-Coleman
(74) Attorney, Agent, or Firm — Morgan, Lewis & Bockius LLP (57) ABSTRACT

An apparatus for starting an engine of a mild hybrid electric vehicle may include: an ignition switch including a plurality of contact points; an external temperature detector configured for detecting an external temperature of the mild hybrid electric vehicle; an SOC detector configured for detecting a state of charge (SOC) of a battery; a mild starter & generator (MHSG) including a stator and a rotor disposed inside the stator, and starting the engine or generating electricity according to an output of the engine; a starter starting the engine; an MHSG wheel rotating integrally with the rotor, and having at least three teeth on a circumference thereof; an MHSG position detector configured for detecting positions of the teeth; and a controller determining a top dead center (TDC) of a predetermined cylinder based on a signal of the MHSG position sensor.

11 Claims, 5 Drawing Sheets

APPARATUS AND METHOD FOR STARTING ENGINE OF MILD HYBRID ELECTRIC VEHICLE

CROSS-REFERENCE TO RELATED APPLICATION

The present application claims priority to Korean Patent Application No. 10-2016-0169481 filed on Dec. 13, 2016, the entire contents of which is incorporated herein for all purposes by this reference.

BACKGROUND OF THE INVENTION

Field of the Invention

The present invention relates to an apparatus and a method for starting an engine of a mild hybrid electric vehicle.

Description of Related Art

As is generally known in the art, a hybrid electric vehicle utilizes an internal combustion engine and a battery power source together. The hybrid electric vehicle efficiently combines torque of the internal combustion engine and a torque of a motor.

Hybrid electric vehicles may be divided into a hard type and a mild type according to power sharing ratio between an engine and a motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor configured for generating driving torque is used in addition to an integrated starter & generator (ISG) configured to start the engine or generate electricity.

The MHSG may assist torque of the engine according to running states of the vehicle and may charge a battery (e.g., 48 V battery) through regenerative braking. Accordingly, fuel efficiency of the mild hybrid electric vehicle may be improved.

The mild hybrid electric vehicle includes a starter and the MHSG used as motors for starting the engine. When the engine is started by the starter in a very cold weather, there has been a problem in that a time required to start the engine is increased.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing an apparatus and a method for starting an engine of a mild hybrid electric vehicle having advantages of improving startability of the engine when external temperature is low.

An apparatus for starting an engine of a mild hybrid electric vehicle according to an exemplary embodiment of the present invention may include: an ignition switch including a plurality of contact points; an external temperature detector configured for detecting an external temperature of the mild hybrid electric vehicle; an SOC detector configured for detecting a state of charge (SOC) of a battery; a mild hybrid starter & generator (MHSG) including a stator and a rotor disposed inside the stator, and starting the engine or generating electricity according to an output of the engine; a starter starting the engine; an MHSG wheel rotating integrally with the rotor, and having at least three teeth on a circumference thereof; an MHSG position detector configured for detecting positions of the teeth; and a controller determining a top dead center (TDC) of a predetermined cylinder based on a signal of the MHSG position detector, wherein the controller operates the MHSG and the starter to start the engine when the external temperature is less than a predetermined temperature and the SOC of the battery is greater than a predetermined SOC.

When the external temperature is less than the predetermined temperature and the SOC of the battery is greater than the predetermined SOC, the controller may operate the MHSG such that a position of a camshaft of the engine becomes a predetermined position.

When the external temperature is equal to or greater than the predetermined temperature, the controller may operate the starter to start the engine.

When the external temperature is less than the predetermined temperature and the SOC of the battery is equal to or less than the predetermined SOC, the controller may operate the starter to start the engine.

Sizes and intervals of the at least three teeth may be different from each other.

The at least three teeth may include a first tooth, a second tooth and a third tooth, a distance between a positive flank and a negative flank of the first tooth, a distance between a positive flank and a negative flank of the second tooth, and a distance between a positive flank and a negative flank of the third tooth may be different from each other, and a distance between the negative flank of the first tooth and positive flank of the second tooth, a distance between the negative flank of the second tooth and the positive flank of the third tooth, and a distance between the negative flank of the third tooth and the positive flank of the first tooth may be different from each other.

A hole may be formed at a center of the MHSG wheel and a rotation shaft of the rotor may penetrate the hole.

A method for starting an engine using an apparatus including an ignition switch including a plurality of contact points; an external temperature detector configured for detecting an external temperature of a mild hybrid electric vehicle; an SOC detector configured for detecting a state of charge (SOC) of a battery; a mild hybrid starter & generator (MHSG) including a stator and a rotor disposed inside the stator, and starting the engine or generating electricity according to an output of the engine; a starter starting the engine; an MHSG wheel rotating integrally with the rotor, and having at least three teeth on a circumference thereof; an MHSG position detector configured for detecting positions of the teeth; and a controller determining a top dead center (TDC) of a predetermined cylinder based on a signal of the MHSG position detector according to an exemplary embodiment of the present invention may include: comparing the external temperature with a predetermined temperature; comparing the SOC of the battery with a predetermined SOC when the external temperature is less than the predetermined temperature; and operating the MHSG and the starter to start the engine when the SOC of the battery is greater than the predetermined SOC.

The method may further include, when the external temperature is less than the predetermined temperature and the SOC of the battery is greater than the predetermined SOC, operating the MHSG such that a position of a camshaft of the engine becomes a predetermined position.

The method may further include, when the external temperature is equal to or greater than the predetermined temperature, operating the starter to start the engine.

The method may further include, when the external temperature is equal to or less than the predetermined temperature and the SOC of the battery is equal to or less than the predetermined SOC, operating the starter to start the engine.

According to an exemplary embodiment of the present invention, an MHSG and a starter are simultaneously operated when external temperature is very low, improving startability of an engine.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, exemplary embodiments of the present application will be described more fully with reference to the accompanying drawings, in which exemplary embodiments of the invention are shown. However, the present invention is not limited the exemplary embodiments which are described herein, and may be modified in various different ways.

Parts which are not related with the description are omitted for clearly describing the exemplary embodiment of the present invention, and like reference numerals refer to like or similar elements throughout the specification.

Since each component in the drawings is arbitrarily illustrated for easy description, the present invention is not particularly limited to the components illustrated in the drawings.

Figure 1:
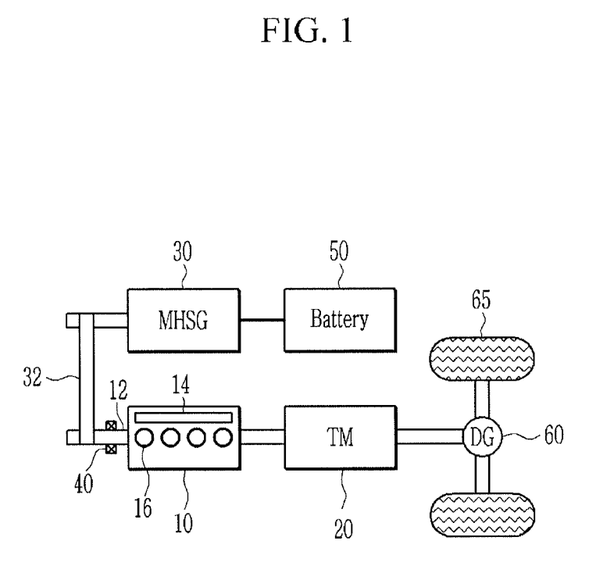
FIG. 1 is a block diagram of a mild hybrid electric vehicle according to an exemplary embodiment of the present invention.

FIG. 1 is a block diagram of a mild hybrid electric vehicle according to an exemplary embodiment of the present invention.

As shown in FIG. 1, a mild hybrid electric vehicle according to an exemplary embodiment of the present invention includes an engine 10, a transmission 20, a mild hybrid starter & generator (MHSG) 30, a starter 40, a battery 50, a differential gear apparatus 60, and a wheel 65.

The engine 10 burns fuel and air to convert chemical energy into mechanical energy. Ignition timing, an air amount, a fuel amount, and an air-fuel ratio may be controlled to generate combustion torque of the engine 10.

With reference to torque transmission of the mild hybrid electric vehicle, torque generated from the engine 10 is transmitted to an input shaft of the transmission 20, and a torque output from an output shaft of the transmission 20 is transmitted to an axle via the differential gear apparatus 60. The axle rotates the wheel 60 such that the mild hybrid electric vehicle runs by the torque generated from the engine 10.

The transmission 20 may be an automatic transmission or a manual transmission. The automatic transmission controls hydraulic pressure by operating a plurality of solenoid valves based on a speed of the mild hybrid electric vehicle and a position of an accelerator pedal, such that a shift gear of a target gear stage is operated and shifting is automatically performed. In the case of the manual transmission, shifting is performed as a driver steps on a clutch pedal and moves a gear lever to a desired gear stage.

The MHSG 30 converts electrical energy into mechanical energy or converts the mechanical energy into the electrical energy. In other words, the MHSG 30 starts the engine 10 or generates electricity according to an output of the engine 10. In addition, the MHSG 30 may assist the torque of the engine 10. The torque of the engine 10 may be used as main torque, and a torque of the MHSG 30 may be used as auxiliary torque. The MHSG 30 may be connected to a crankshaft 12 and a camshaft 14 of the engine 10 through a belt 32.

The starter 40 starts the engine 10. The starter 40 may be directly connected to the crankshaft 12.

The battery 50 may supply electricity to the MHSG 30, and may be charged through electricity recovered by the MHSG 30. The battery 50 is a high voltage battery (e.g., 48 V battery), and may be a lithium-ion battery. The mild hybrid electric vehicle may further include a low voltage battery DC-DC converter (LDC) converting a voltage supplied form the battery 50 into a low voltage, and a low voltage battery (e.g., a 12 V battery) supplying a low voltage to electrical loads (e.g., a headlamp and an air conditioner).

Figure 2:
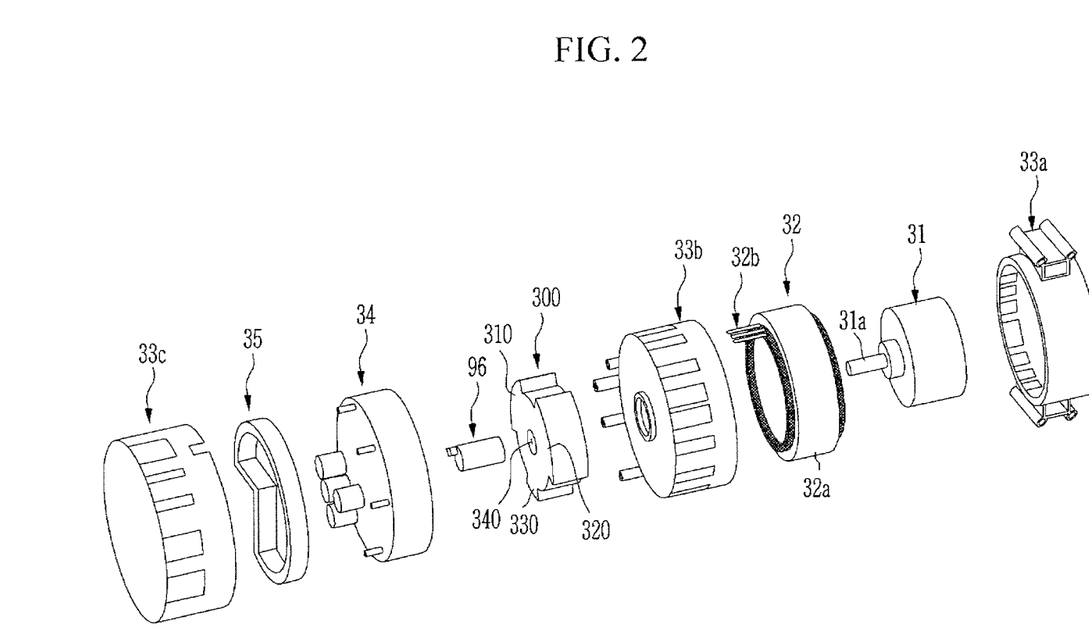
FIG. 2 is an exploded perspective view of an MHSG according to an exemplary embodiment of the present invention.
Figure 3:
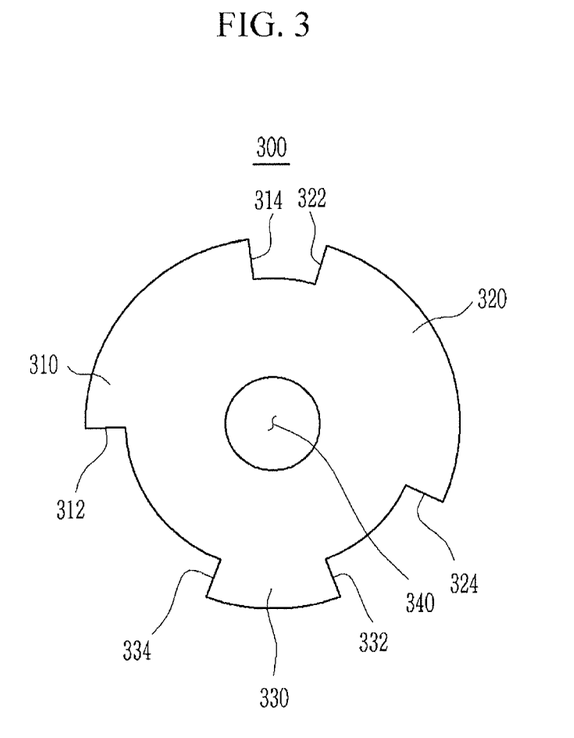
FIG. 3 is a cross-sectional view of an MHSG wheel according to an exemplary embodiment of the present invention.

FIG. 2 is an exploded perspective view of an MHSG according to an exemplary embodiment of the present invention, and FIG. 3 is a cross-sectional view of an MHSG wheel according to an exemplary embodiment of the present invention.

Referring to FIG. 2 and FIG. 3, an MHSG 30 according to an exemplary embodiment of the present invention may include a rotor 31, a stator 32, a first case 33a, a second case 33b, a third case 33c, a power module 34, a control module 35, an MHSG wheel 300, and an MHSG position detector 96.

A rotation shaft 31a is coupled to a center of the rotor 31, and the rotor 31 is disposed inside the stator 32 such that an external circumference of the rotor 31 is distanced from an internal circumference of the stator 32 by a predetermined interval. The rotor 31 is rotatable disposed inside the stator 32.

The stator 32 includes a stator core 32a including an electric steel plate and a coil 32b wound around the stator core 32a. The coil 32b is electrically connected to the power module 34 to receive a current from the power module 34. When the current applied to the coil 32b from the power module 34, the rotor 31 is rotated by flux, and the MHSG 30 generates torque.

The first case 33a and the second case 33b are formed to surround the rotor 31 and the stator 32. The stator 32 may be fixedly installed inside the second case 33b.

The second case 33b and the third case 33c are formed to surround the power module 34 and the control module 35. The power module 34 and the control module 35 may be fixedly installed inside the third case 33c.

The power module 34 applies the current to the coil 32b of the stator 32 according to a control signal of the control module 35.

The control module 35 controls operation of the power module 34 according to a control signal of a controller 80 (refer to FIG. 4) and controls the current applied to the coil 32b of the stator 32. In addition, the control module 35 receives a signal of the MHSG position detector 96 and transmits a signal corresponding thereto to the controller 80.

The MHSG wheel 300 rotates integrally with the rotor 31. A hole 340 is formed at a center of the MHSG wheel 300, and the rotation shaft 31a of the rotor 31 may be fixed to penetrate the hole 340. At least three teeth 310, 320 and 330 are formed on a circumference of the MHSG wheel 300. Sizes and intervals of the plurality of teeth 310, 320 and 330 may be different from each other.

Each of the at least three teeth 310, 320 and 330 includes a positive flank and a negative flank. Herein, the positive flank is a portion where a tooth starts along a rotation direction of the MHSG wheel 300, and the negative flank is a portion where a tooth end portions along the rotation direction of the MHSG wheel 300.

A distance b' between a positive flank 312 and a negative flank 314 of the first tooth 310, a distance d' between a positive flank 322 and a negative flank 324 of the second tooth 320, and a distance f' between a positive flank 332 and a negative flank 334 of the third tooth 330 may be different from each other. In addition, a distance between c' the negative flank 314 of the first tooth 310 and the positive flank 322 of the second tooth 320, a distance e' between the negative flank 324 of the second tooth 320 and the positive flank 332 of the third tooth 330, and a distance a' between the negative flank 334 of the third tooth 330 and the positive flank 312 of the first tooth 310 may be different from each other.

The MHSG position detector 96 detects positions of the at least three teeth 310, 320 and 330 (i.e., a position of the MHSG wheel 300), and transmits a signal corresponding thereto to the control module 35. The MHSG position detector 96 may be fixedly disposed at the power module 34.

Figure 4:
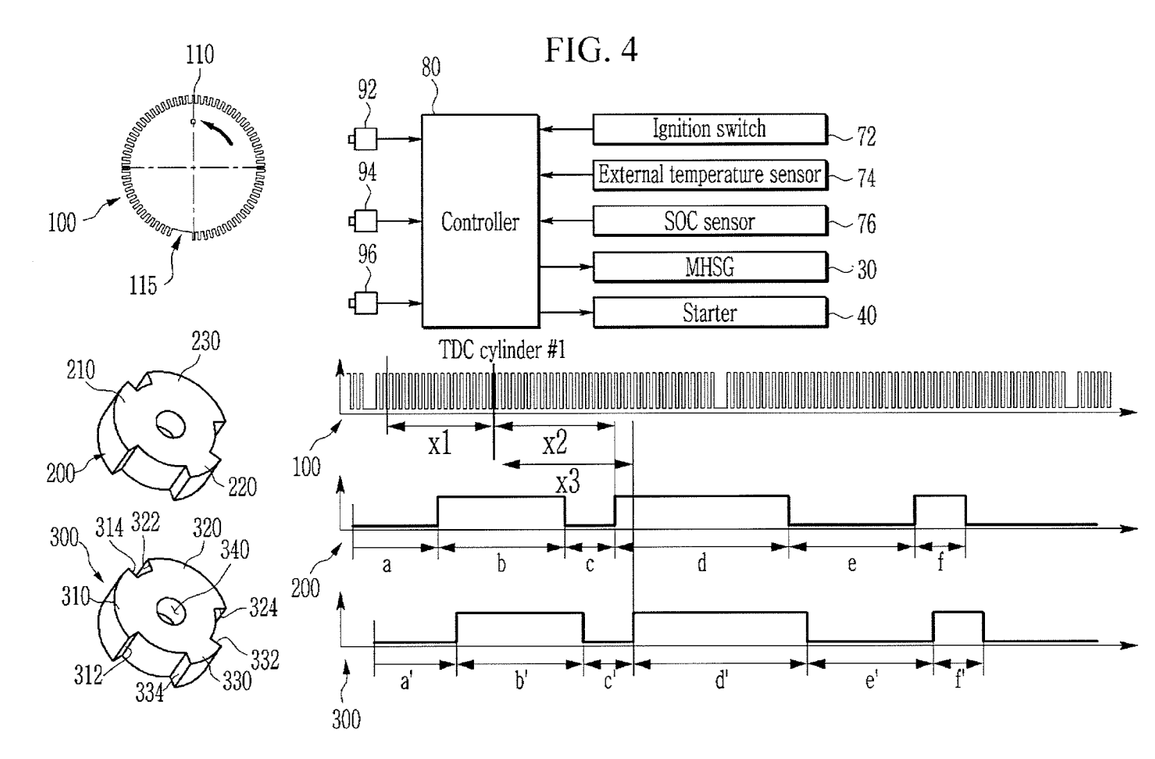
FIG. 4 is a view illustrating an apparatus for starting an engine of a mild hybrid electric vehicle according to an exemplary embodiment of the present invention.

FIG. 4 is a view illustrating an apparatus for starting an engine of a mild hybrid electric vehicle according to an exemplary embodiment of the present invention.

As shown in FIG. 4, an apparatus for starting an engine according to an exemplary embodiment of the present invention may include an ignition switch 72, an external temperature detector 74, an SOC detector 76, the MHSG wheel 300, the MHSG position detector 96, the controller 80, the MHSG 30, and a starter 40.

The ignition switch 72 may include a plurality of contact points. The plurality of contact points may include an OFF contact point, an ACC contact point, an ON contact point, and a START contact point. When the OFF contact point is selected, the engine is turned off. When the ACC contact point is selected, accessory devices including a radio may be used. When the ON contact point is selected, electronic devices using a voltage of the battery 50 may be used. When the START contact point is selected, the engine 10 is started. Contact points of the ignition switch 72 may be selected by a starting key or a starting button.

The external temperature detector 74 detects an external temperature of the mild hybrid electric vehicle, and transmits a signal corresponding thereto to the controller 80.

The SOC detector 76 detects a state of charge (SOC) of the battery 50, and transmits a signal corresponding thereto to the controller 80.

A crankshaft wheel 100 is mounted to the crankshaft 12 of the engine 10 so that it integrally rotates with the crankshaft 12, and a plurality of teeth 110 are formed on a circumference of the crankshaft wheel 100. Sizes and intervals of the plurality of teeth 110 are the same, and a guide groove 115 is formed on a portion of the crankshaft wheel 100 to detect a reference position of the crankshaft 12.

The crankshaft position detector 92 detects positions of the plurality of teeth 110 (i.e., a position of the crankshaft 12), and transmits a signal corresponding thereto to the controller 80. The controller 80 may determine a rotation speed of the engine 10 based on the signal of the crankshaft position detector 92.

A camshaft wheel 200 is mounted to the camshaft 14 of the engine 10 so that it integrally rotates with the camshaft 14, and a plurality of teeth 210, 220 and 230 with non-uniform interval are formed on a circumference of the camshaft wheel 200. Sizes and intervals of the plurality of teeth 210, 220 and 230 may be different from each other.

The camshaft position detector 94 detects positions of teeth 210, 220 and 230 (i.e., a position of the camshaft 14), and transmits a signal corresponding thereto to the controller 80. The controller 80 may detect a top dead center (TDC) of a predetermined cylinder 16 based on the signal of the camshaft position detector 94. In a case of a four-cylinder engine, the predetermined cylinder 16 may be a first cylinder, and the camshaft 14 may rotate once when the crankshaft 12 rotates twice.

The MHSG wheel 300 is mounted to the MHSG 30 so that it integrally rotates with the MHSG 30, and at least three teeth 310, 320 and 330 are formed on the circumference of the MHSG 30. Sizes and intervals of the at least three teeth 310, 320 and 330 may be different from each other. In addition, intervals of the teeth 310, 320 and 330 of the MHSG wheel 300 are the same as the teeth 210, 220 and 230 of the camshaft wheel by a predetermined angle difference (x3−x2).

The MHSG position detector 96 detects positions of the at least three teeth 310, 320 and 330 (i.e., a position of the MHSG wheel 300), and transmits a signal corresponding thereto to the control module 35. The control module 35 transmits the signal to the controller 80. The controller 80 may detect a top dead center (TDC) of the predetermined cylinder 16 based on the signal of the MHSG position detector 96.

The controller 80 may control operation of the MHSG 30 based on the signals of the crankshaft position detector 92, the camshaft position detector 94, and the MHSG position detector 96. In addition, the controller 80 may control operations of the MHSG 30 and the starter 40 based on the signals of the ignition switch 72, the external temperature detector 74, and the SOC detector 76. The controller 80 may be implemented with one or more processors executed by a predetermined program, and the predetermined program may include a series of commands for performing each step included in a method for starting an engine of a mild hybrid electric vehicle according to an exemplary embodiment of the present invention to be described below.

Hereinafter, a method for starting an engine of a mild hybrid electric vehicle according to an exemplary embodiment of the present invention will be described in detail with reference to FIGS. 2 to 5.

Figure 5:
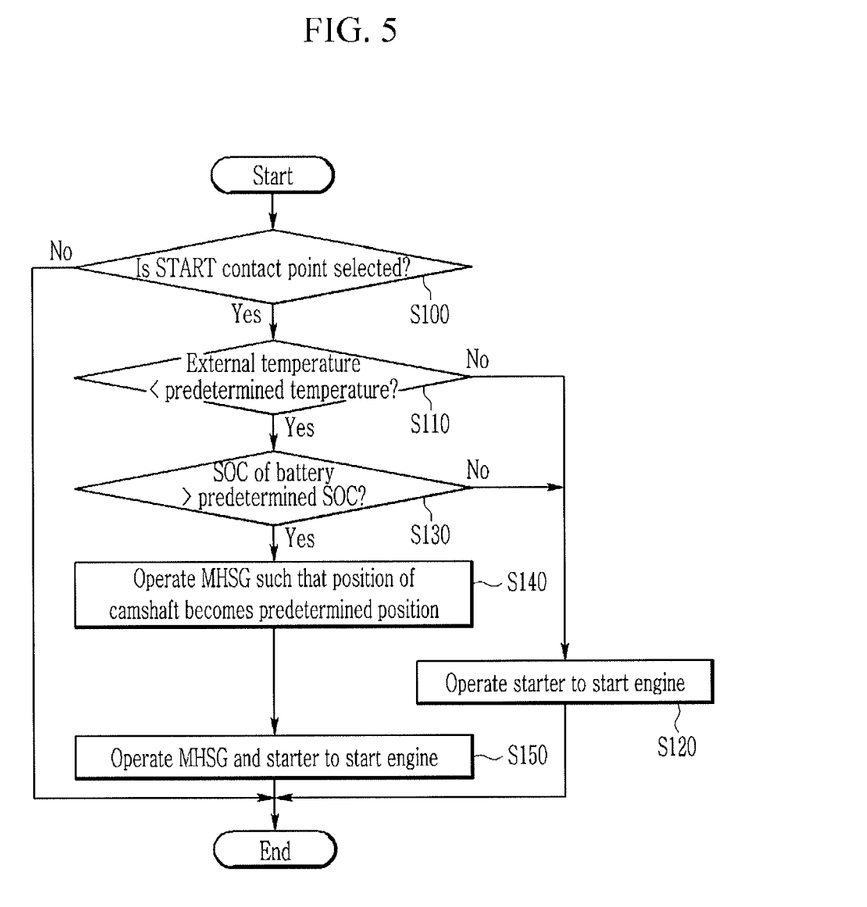
FIG. 5 is a flowchart illustrating a method for starting an engine of a mild hybrid electric vehicle according to an exemplary embodiment of the present invention.

FIG. 5 is a flowchart illustrating a method for starting an engine of a mild hybrid electric vehicle according to an exemplary embodiment of the present invention.

Referring to FIGS. 2 to 5, the controller 80 determines whether the START contact point of the ignition switch 72 is selected at step S100.

When the START contact point of the ignition switch 72 is not selected at step S100, the controller 80 finishes the method for starting the engine of the mild hybrid electric vehicle according to an exemplary embodiment of the present invention.

When the START contact point of the ignition switch 72 is selected at step S100, the controller 80 compares the external temperature with a predetermined temperature at step S110. The predetermined temperature may be determined by a person of ordinary skill in the art to determine whether a cold start condition of the engine 10 is satisfied. For example, the predetermined temperature may be −20° C.

When the external temperature is equal to or greater than the predetermined temperature at step S110, the controller 80 operates the starter 30 to start the engine 10 at step S120.

When the external temperature is less than the predetermined temperature at step S110, the controller 80 compares the SOC of the battery 50 with a predetermined SOC at step S130. The predetermined SOC may be determined by a person of ordinary skill in the art to determine whether the battery 50 can be fully discharged.

When the SOC of the battery 50 is equal to or less than the predetermined SOC at step S130, the controller 80 operates the starter 40 to start the engine 10 at step S120. In other words, when the MHSG 30 and the starter 40 are simultaneously operated to start the engine 10 at step S120, there is a possibility that the battery 50 is fully discharged and thus only the starter 40 is operated to start the engine 10.

When the SOC of the battery 50 is greater than the predetermined SOC at step S130, the controller 80 operates the MHSG 30 such that the position of the camshaft 13 of the engine 10 becomes a predetermined position at step S140. The predetermined position may be determined by a person of ordinary skill in the art in consideration of efficiency of starting and combustion safety. Because the position of the camshaft 14 exists at the predetermined position when starting the engine 10, fuel injection may be started from a specific cylinder, starting the engine 10 without a delay time.

When the position of the camshaft 14 becomes the predetermined position, the controller 80 operates the MHSG 30 and the starter 40 to start the engine 10 at step S150. Accordingly, startability of the engine 10 may be improved even when external temperature is very low.

As described above, according to an exemplary embodiment of the present invention, startability of the engine 10 may be improved in a very cold weather.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for starting an engine of a mild hybrid electric vehicle, the apparatus comprising:
    an ignition switch including a plurality of contact points;
    an external temperature detector detecting an external temperature of the mild hybrid electric vehicle;
    a state of charge (SOC) detector detecting a state of charge (SOC) of a battery;
    a mild hybrid starter & generator (MHSG) including a stator and a rotor disposed inside the stator, and starting the engine or generating electricity according to an output of the engine;
    a starter starting the engine;
    an MHSG wheel rotating integrally with the rotor of the MHSG, and having at least three teeth on a circumference thereof;
    an MHSG position detector detecting positions of the teeth; and
    a controller configured for determining a top dead center (TDC) of a predetermined cylinder based on a signal of the MHSG position detector,
    wherein the controller is configured to operate the MHSG and the starter to start the engine when the external temperature is less than a predetermined temperature and the SOC of the battery is greater than a predetermined SOC.

2. The apparatus of claim 1, wherein, when the external temperature is less than the predetermined temperature and the SOC of the battery is greater than the predetermined SOC, the controller is configured to operate the MHSG, such that a position of a camshaft of the engine are a predetermined position.

3. The apparatus of claim 1, wherein, when the external temperature is equal to or greater than the predetermined temperature, the controller is configured to operate the starter to start the engine.

4. The apparatus of claim 1, wherein, when the external temperature is less than the predetermined temperature and the SOC of the battery is equal to or less than the predetermined SOC, the controller is configured to operate the starter to start the engine.

5. The apparatus of claim 1, wherein sizes and intervals of the at least three teeth are different from each other.

6. The apparatus of claim 1, wherein the at least three teeth includes a first tooth, a second tooth and a third tooth,
a distance between a positive flank and a negative flank of the first tooth, a distance between a positive flank and a negative flank of the second tooth, and a distance between a positive flank and a negative flank of the third tooth are different from each other, and
a distance between the negative flank of the first tooth and the positive flank of the second tooth, a distance between the negative flank of the second tooth and the positive flank of the third tooth, and a distance between the negative flank of the third tooth and the positive flank of the first tooth are different from each other.

7. The apparatus of claim 1, wherein a hole is formed at a center of the MHSG wheel and a rotation shaft of the rotor penetrates the hole.

8. A method for starting an engine using an apparatus including an ignition switch having a plurality of contact points; an external temperature detector detecting an external temperature of a mild hybrid electric vehicle; a state of charge (SOC) detector detecting a state of charge (SOC) of a battery; a mild starter & generator (MHSG) including a stator and a rotor disposed inside the stator, and starting the engine or generating electricity according to an output of the engine; a starter starting the engine; an MHSG wheel rotating integrally with the rotor, and having at least three teeth on a circumference thereof, an MHSG position detector detecting positions of the teeth; and a controller configured for determining a top dead center (TDC) of a predetermined cylinder based on a signal of the MHSG position detector, the method comprising:
 comparing, by the controller, the external temperature with a predetermined temperature;
 comparing, by the controller, the SOC of the battery with a predetermined SOC when the external temperature is less than the predetermined temperature; and
 operating, by the controller, the MHSG and the starter to start the engine when the SOC of the battery is greater than the predetermined SOC.

9. The method of claim 8, further including: when the external temperature is less than the predetermined temperature and the SOC of the battery is greater than the predetermined SOC, operating the MHSG such that a position of a camshaft of the engine are a predetermined position.

10. The method of claim 8, further including: when the external temperature is equal to or greater than the predetermined temperature, operating the starter to start the engine.

11. The method of claim 8, further including: when the external temperature is equal to or less than the predetermined temperature and the SOC of the battery is equal to or less than the predetermined SOC, operating the starter to start the engine.

* * * * *